Patented July 6, 1937

2,085,794

UNITED STATES PATENT OFFICE 2,085,794

URINARY ANTISEPTIC

Floyd De Eds, John O. Thomas, and Clyde W. Eddy, San Francisco, Calif., assignors to Henry A. Wallace as Secretary of Agriculture of the United States No Drawing. Application June 22, 1936, Serial No. 86,560

5 Claims. (Cl. 167—65)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

This invention relates to the use of phenothiazine and its oxidation derivatives as antiseptics and more particularly to their use as urinary antiseptics.

For treatment of infections of the urinary tract it is desirable that the antiseptic possess the following characteristics:

1. The therapeutic dose should be far below the toxic-margin of safety.
2. Ease of administering.
3. Stability.
4. Ready absorbability.
5. Non-injurious to digestive tract.
6. Non-destroyable before action.
7. Non-cumulative.
8. Absence of tolerance-development.
9. Ability to act in acid, neutral, or alkaline urine.

Phenothiazine and its three oxidation derivatives, diphenylamine ortho-sulphoxide, mono-oxy-thiodiphenylimid, and dioxythiodiphenylimid meet these requirements. Phenothiazine has the following structural formula:

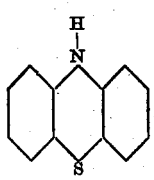

The following structural formulas are submitted, but the scientific literature is not in accord regarding the exact structure of the imid compounds:

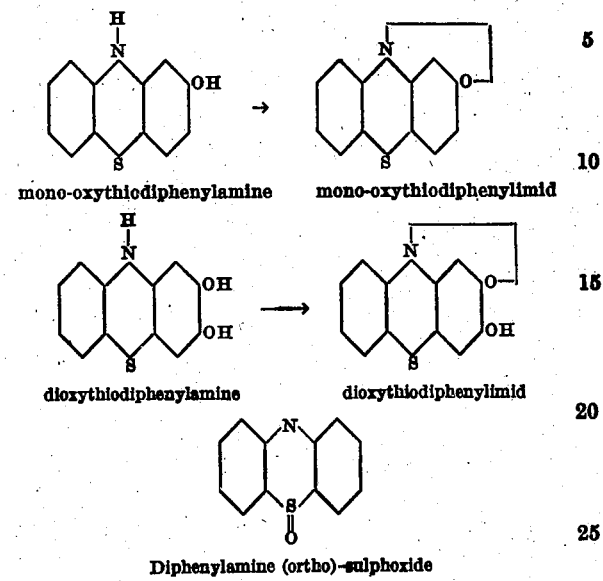

Extensive research conducted on rats, rabbits, and finally on human individuals, after demonstration of the safety of the procedure, have shown that after oral administration of phenothiazine the following results are obtained:

1. Rapid absorption from the digestive tract.
2. Conversion to one or more of the above oxidation products.
3. Excretion of the converted material through the kidneys and into the bladder.
4. Conferring of bactericidal properties to the urine by the product or products excreted in the urine.
5. Bactericidal action from doses of phenothiazine below the toxic-margin of safety.
6. Freedom from injury to the digestive tract and rest of the body by therapeutic doses.
7. Absence of tolerance-development.

8. Bactericidal properties in acid, neutral, and alkaline urines.

The medicine is administered orally and the dosage may range from a rate of .01 of a gram of phenothiazine per kilogram of body weight to a maximum of not over .25 of a gram per kilogram of body weight, the period of the dosage not to exceed one week at one time.

When phenothiazine is administered by mouth to rats, rabbits or man, there appears in the urine dioxythiodiphenylamine and probably also mono-oxythiodiphenylamine, both compounds being excreted in conjugated form. Available evidence shows the compounds to be conjugated as the sulphates. Depending upon the pH or hydrogen ion concentration of the urine, varying degrees of hydrolysis of the conjugated compounds take place with the liberation of free dioxythiodiphenylamine and mono-oxythiodiphenylamine. Following hydrolysis spontaneous oxidation takes place, the rate of oxidation being dependent upon the pH or hydrogen ion concentration of the urine. As a result of the oxidation of the hydrolyzed products in the urine there is present dioxythiodiphenylimid and mono-oxythiodiphenylimid. The proportion of these two compounds is variable and it is highly probable that eventually all the mono-oxythiodiphenylimid is further oxidized to dioxythiodiphenylimid. Therefore, following administration of phenothiazine by mouth urine may contain varying amounts of conjugated mono-oxythiodiphenylamine, conjugated dioxythiodiphenylamine, free mono-oxythiodiphenylamine, free dioxythiodiphenylamine, and the further oxidation products mono-oxythiodiphenylimid and dioxythiodiphenylimid. The relative amounts of these compounds present in the urine is dependent upon the pH or hydrogen ion concentration of the urine and the time elapsed since voiding of the urine.

Such urines possess bactericidal properties. Whether all of the compounds which are present or only one of them is bactericidal has not been determined to date, because a sufficient supply of these different compounds in pure state has not been available for purposes of investigations. Nevertheless, the fact has been established by addition of bacteria to urine in the test tube following oral administration of phenothiazine, and by the disappearance of bacteria from the urine of rabbits experimentally given cystitis, and by the disappearance of bacteria in human cases of cystitis that oral administration of phenothiazine leads to the excretion of a bactericidal urine.

Having fully disclosed our invention we claim:

1. A urinary antiseptic, comprising phenothiazine and its oxidation derivatives as the essential active ingredients.

2. A urinary antiseptic comprising diphenylamine-orthosulphoxide as the essential active ingredient.

3. A urinary antiseptic, comprising mono-oxythiodiphenylimid as the essential active ingredient.

4. A urinary antiseptic, comprising dioxythiodiphenylimid as the essential active ingredient.

5. A urinary antiseptic comprising phenothiazine as the esesntial active ingredient.

FLOYD DE EDS.
JOHN O. THOMAS.
CLYDE W. EDDY.